US010404965B2

(12) United States Patent
Matsubara

(10) Patent No.: US 10,404,965 B2
(45) Date of Patent: Sep. 3, 2019

(54) MICROSCOPE SYSTEM

(71) Applicant: OLYMPUS CORPORATION, Tokyo (JP)

(72) Inventor: Daiki Matsubara, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 240 days.

(21) Appl. No.: 15/360,413

(22) Filed: Nov. 23, 2016

(65) Prior Publication Data

US 2017/0163964 A1 Jun. 8, 2017

(30) Foreign Application Priority Data

Dec. 4, 2015 (JP) ................................ 2015-237400

(51) Int. Cl.
*G02B 21/02* (2006.01)
*G02B 21/06* (2006.01)
(Continued)

(52) U.S. Cl.
CPC ......... *H04N 13/204* (2018.05); *G02B 21/025* (2013.01); *G02B 21/06* (2013.01);
(Continued)

(58) Field of Classification Search
CPC ............... H04N 13/204; H04N 5/2352; H04N 5/23216; G02B 21/025; G02B 21/248;
(Continued)

(56) References Cited

U.S. PATENT DOCUMENTS 6,256,016 B1 * 7/2001 Piot ....................... G06F 3/0317 250/208.2
6,903,323 B2 * 6/2005 Cartlidge ............... G02B 27/46 250/208.1
(Continued)

FOREIGN PATENT DOCUMENTS

JP 2001-208974 A 8/2001
JP 2010-117229 A 5/2010

OTHER PUBLICATIONS

Don Light, "A Basis for Estimating Digital Camera Parameters", Photogrammetric Engineering & Remote Sensing vol. 70, No. 3, Mar. 2004, pp. 297-300. (Year: 2004).*

*Primary Examiner* — Richard A Hansell, Jr.
(74) *Attorney, Agent, or Firm* — Scully, Scott, Murphy & Presser, P.C.

(57) ABSTRACT

A microscope system having a microscope forming an image of a specimen inserted onto an optical axis, an image-acquisition apparatus having an image-acquisition element which captures the image of the specimen, a purpose input unit with which an acquisition purpose of 3D image data is input, and a controller receiving the acquisition purpose, wherein the controller receives information about the numerical aperture of the microscope and information of a sampling pitch of the image-acquisition element, calculates a microscope resolution value and an image-acquisition-element resolution value on the basis of the received information, and sends at least one of the control signal for controlling the numeral aperture and the control signal for controlling the sampling pitch in response to the acquisition purpose to at least one of the microscope and the image-acquisition apparatus so that the calculated microscope resolution value and the calculated image-acquisition-element resolution value become the same.

4 Claims, 10 Drawing Sheets

(51) Int. Cl.

| | |
|---|---|
| ***G02B 21/24*** | (2006.01) |
| ***G02B 21/26*** | (2006.01) |
| ***G02B 21/36*** | (2006.01) |
| ***H04N 5/232*** | (2006.01) |
| ***H04N 5/235*** | (2006.01) |
| ***H04N 13/204*** | (2018.01) |

(52) U.S. Cl.
CPC ........... *G02B 21/248* (2013.01); *G02B 21/26* (2013.01); *G02B 21/361* (2013.01); *G02B 21/365* (2013.01); *H04N 5/2352* (2013.01); *H04N 5/23216* (2013.01)

(58) Field of Classification Search
CPC ...... G02B 21/26; G02B 21/06; G02B 21/365; G02B 21/361
USPC ............................................................ 348/79
See application file for complete search history.

(56) References Cited

U.S. PATENT DOCUMENTS

| | | | | |
|---|---|---|---|---|
| 7,122,776 | B2 * | 10/2006 | Fein | G02B 21/365 250/208.1 |
| 9,077,901 | B2 | 7/2015 | Bhat et al. | |
| 2001/0009473 | A1 | 7/2001 | Ogino | |
| 2003/0016301 | A1 * | 1/2003 | Aizaki | G02B 21/365 348/345 |
| 2005/0023439 | A1 * | 2/2005 | Cartlidge | G02B 27/0012 250/208.1 |
| 2009/0046192 | A1 * | 2/2009 | Molnar | G01N 21/84 348/311 |
| 2012/0224034 | A1 * | 9/2012 | Kalkbrenner | G01N 21/6458 348/49 |
| 2014/0361154 | A1 * | 12/2014 | Hayashi | G02B 21/0076 250/234 |
| 2015/0278625 | A1 * | 10/2015 | Finkbeiner | G02B 21/26 348/79 |

* cited by examiner

MICROSCOPE SYSTEM

CROSS-REFERENCE TO RELATED APPLICATIONS

This application is based on Japanese Patent Application No. 2015-237400 filed on Dec. 4, 2015, the contents of which are incorporated herein by reference.

TECHNICAL FIELD

The present invention relates to a microscope system.

BACKGROUND ART

In the related art, an apparatus that can obtain an all-focused image, three-dimensional shape data, and a three-dimensional image (hereinafter, generally referred to as 3D image data) of an observation target has been proposed for observing a specimen having indentations and projections (for example, see PTL 1 to PTL 3).

CITATION LIST

Patent Literature

{PTL 1}

Japanese Unexamined Patent Application, Publication No.

{PTL 2}

U.S. Pat. No. 9,077,901

{PTL 3}

Japanese Unexamined Patent Application, Publication No. 2010-117229

SUMMARY OF INVENTION

One aspect of the present invention provides a microscope system including: a variable-numerical-aperture microscope that forms an image of a specimen inserted in an optical path; an image-acquisition element that acquires an image of the specimen and converts the image to image data; a purpose input unit for inputting an acquisition purpose of 3D image data; a recognition unit that recognizes a numerical aperture of the microscope and a sampling pitch of the image-acquisition element; a resolution calculating unit that calculates a microscope resolution value and an image-acquisition-element resolution value from the numerical aperture of the microscope and the sampling pitch of the image-acquisition element, recognized by the recognition unit; and a resolution control unit that controls at least one of the numerical aperture of the microscope and the sampling pitch of the image-acquisition element according to the acquisition purpose of the 3D image data input by the purpose input unit, so that the microscope resolution value and the image-acquisition-element resolution value calculated by the resolution calculating unit become equal.

DESCRIPTION OF EMBODIMENT

A microscope system 1 according to an embodiment of die present invention will be described below with reference to the drawings.

Figure 1:
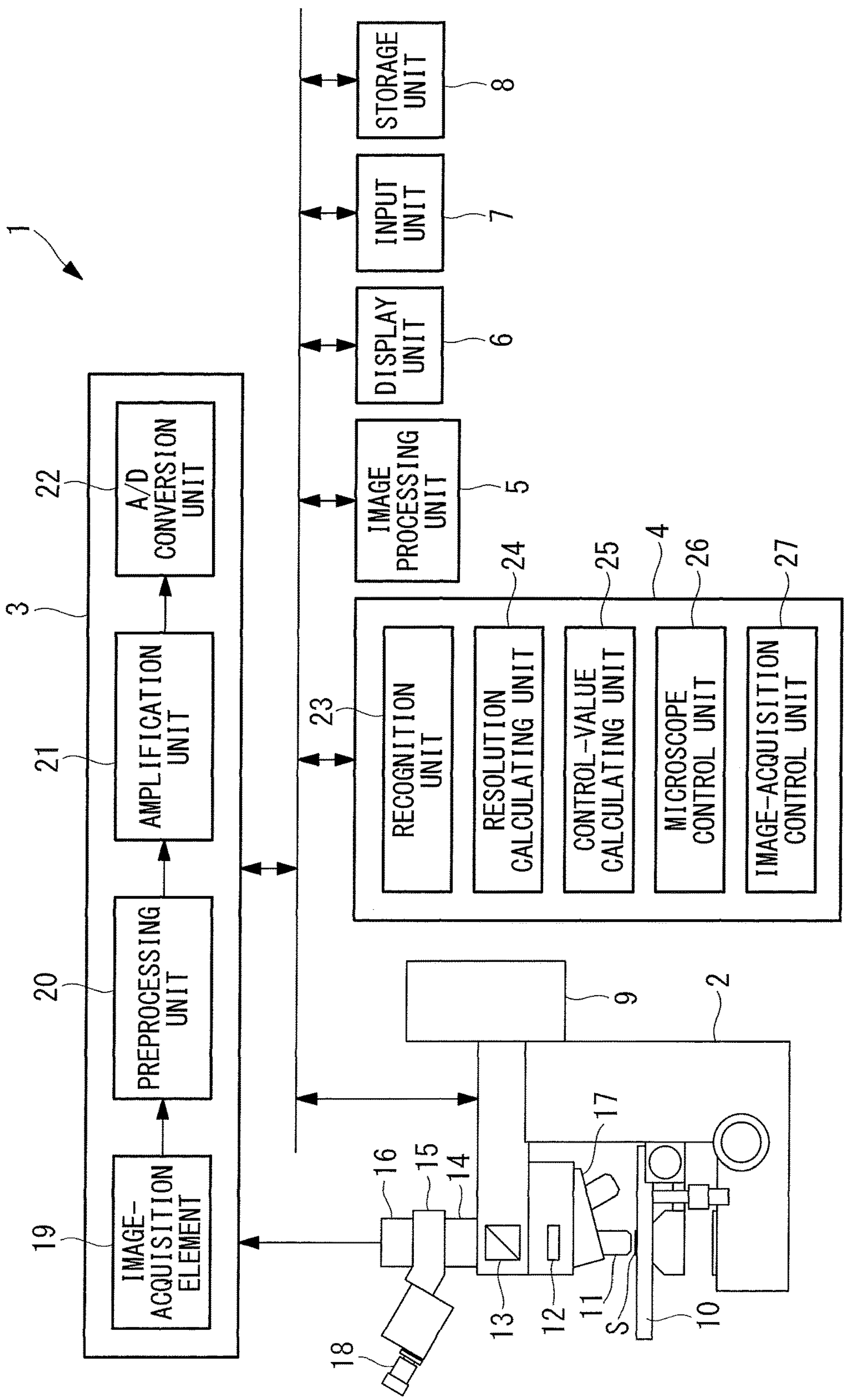
FIG. 1 is a diagram showing the overall configuration of a microscope system according to an embodiment of the present invention.

As shown in FIG. 1, the microscope system 1 according to this embodiment is provided with a microscope body (microscope) 2, an image-acquisition unit (image-acquisition apparatus) 3 that captures an image of a specimen S imaged by the microscope body 2, a control unit 4 that controls the microscope body 2 and the image-acquisition unit 3, and an image processing unit 5 connected to the control unit 4, a display unit 6, an input unit (purpose input unit) 7, and a storage unit 8 that are connected to the control unit 4.

The microscope body 2 is provided with a light source 9 that radiates illumination light, a stage 10 on which the specimen S is mounted and that moves in three-dimensional directions, an objective lens 11 that focuses the illumination light from the light source 9 onto the specimen S disposed on the stage 10 and that collects return light from the specimen S, an aperture diaphragm 12 that allows the return light collected by the objective lens 11 to pass therethrough, a half-mirror 13 that branches off the return light passing through the aperture diaphragm 12 from the light path of the illumination light from the light source 9, a zoom optical system 14 that can change the zoom magnification, a trinocular tube 15, and a camera adaptor 16 to which the image-acquisition unit 3 is attached. Reference numeral 17 in the drawings is a revolver that holds a plurality of the objective lenses 11 in a manner allowing them to be switched among, and reference numeral 18 is an eyepiece lens.

The aperture diaphragm 12 is a variable diaphragm whose aperture diameter can be adjusted, and by opening and closing the aperture diaphragm. 12 by operating an aperture-diaphragm motor 12*a*, which is an aperture-diaphragm driving device, the numerical aperture of the microscope body 2 is changed.

The zoom optical system 14 is provided with a plurality of lenses (not shown) arranged in the optical-axis direction, and by moving one or more of the lenses in the optical-axis direction by means of a lens-moving motor 14*a*, which is a lens-moving driving device, it is possible to change the zoom magnification, thus magnifying or reducing the observed image.

Figure 2:
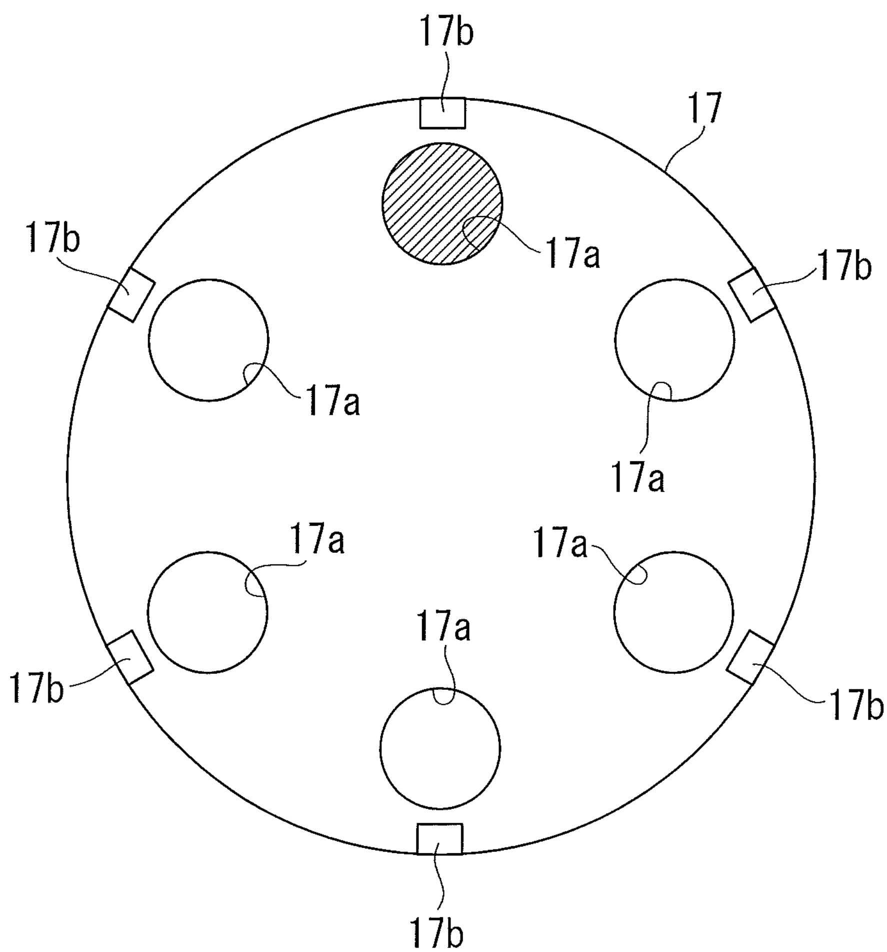
FIG. 2 is a diagram showing an example of a revolver provided in a microscope body of the microscope system in FIG. 1.

As shown in FIG. 2, the revolver 17 is formed in a circular plate shape having a plurality of objective-lens holding holes 17*a* arranged in the circumferential direction, and is designed to be able to selectively position an objective lens 11 held in any one of the objective-lens holding holes 17*a* on the observation optical axis. A hole-identifying tag 17*b* is provided for each objective-lens holding hole 17*a*. A code (hole-identifying information) for identifying each objective-lens holding hole 17*a* in the revolver 17 is assigned to each hole-identifying tag 17*b*. By reading out the hole-identifying information of the hole-identifying tag 17*b* corresponding to the objective-lens holding hole 17*a* (for example, the one with the hatching in FIG. 2), in the revolver 17, that is disposed on the observation optical axis by means of a sensor (not illustrated), it is possible to extract the information about that objective lens 11 to the outside.

The image-acquisition unit 3 attached to the camera adaptor 16 is provided with an image-acquisition element 19, a preprocessing unit 20, an amplification unit 21, and an A/D conversion unit 22.

The image-acquisition element 19, which is a CCD or CMOS device, photoelectrically converts the imaged observation image at a sampling pitch according to a control signal from an image-acquisition control unit 27, which is described below, and inputs an output signal to the preprocessing unit 20.

The preprocessing unit 20 performs correlated double sampling (CDS) of the signal output from the image-acquisition element 19 to produce samples, and outputs the samples to the amplification unit 21.

The amplification unit 21 amplifies the image signals input thereto via the preprocessing unit 20 and outputs the amplified signals to the A/D conversion unit 22.

The A/D conversion unit 22 quantizes the image signal amplified at the amplification unit 21 and outputs quantized data (hereinafter referred to as image data) to the image processing unit 5.

Here, the image processing unit 5 has a function for performing digital processing, such as demosaicing processing or color matrix conversion processing, contrast processing, sharpening processing, or the like, and after performing image processing, outputs an observed image to be displayed on the display unit 6, which is described below.

The input unit 7 is designed so that either "acquisition at high speed" (high-speed acquisition) or "acquisition with high precision" (high-resolution acquisition) can be selected and input thereto as the acquisition purpose of the 3D image data.

The control unit 4 is provided with a recognition unit 23, a resolution calculating unit 24, a control-value calculating unit 25, a microscope control unit (resolution control unit) 26, and an image-acquisition control unit (resolution control unit) 27.

Figure 3:
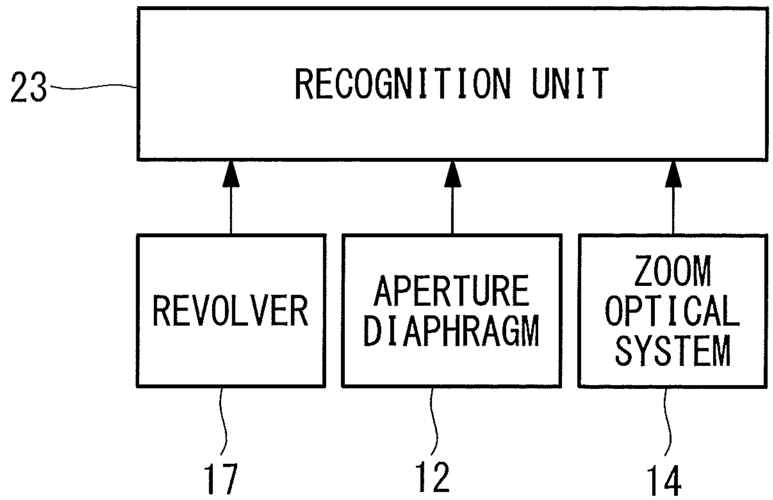
FIG. 3 is a block diagram showing the relationship between a recognition unit and the microscope body provided in the microscope system in FIG. 1.

As shown in FIG. 3, the recognition unit 23 is electrically connected to the revolver 17, the aperture diaphragm 12, and the zoom optical system 14. Accordingly, the recognition unit 23 recognizes the numerical aperture of the microscope body 2 and the sampling pitch of the image-acquisition element 19 on the basis of the hole-identifying information output from the revolver 17, the numerical aperture output from the aperture diaphragm 12, the zoom magnification output from the zoom optical system 14, and the sampling pitch of the image-acquisition element 19 stored in the storage unit 8, which is described below.

The resolution calculating unit 24 is designed to calculate a microscope resolution value (hereinafter simply referred to as RMS) and an image-acquisition-element resolution value (hereinafter simply referred to as RCAM) from the numerical aperture of the microscope body 2 and the sampling pitch of the image-acquisition element 19 which are recognized by the recognition unit 23.

As the resolution values (RMS, RCAM) become larger, the resolution becomes lower, and as the resolution values (RMS, RCAM) become smaller, the resolution becomes higher.

The control-value calculating unit 25 is configured to calculate which of the numerical aperture of the microscope body 2 and the sampling pitch of the image-acquisition element 19 is to serve as a control value for control according to the acquisition purpose of the 3D image data, so that the microscope resolution and image-acquisition-element resolution calculated by the resolution calculating unit 24 become equal.

Specifically, the control-value calculating unit 25, which constitutes part of the control unit 4, performs operation as explained in this embodiment using a specific program stored in memory. Assuming that the acquisition purpose of the 3D image data, which is input from the input unit 7, is acquisition at high speed, the control-value calculating unit 25 is configured so as to calculate the numerical aperture of the microscope body 2 so that RMS=RCAM, in the case where RMS<RCAM, and to calculate the sampling pitch of the image-acquisition element 19 so that RMS=RCAM, in the case where RMS>RCAM.

Assuming that the acquisition purpose of the 3D image data, which is input from the input unit 7, is acquisition with high precision, the control-value calculating unit 25 is configured to calculate the sampling pitch of the image-acquisition element 19 so that RMS=RCAM, in the case where RMS<RCAM, and to calculate the numerical aperture of the microscope body 2 so that RMS=RCAM, in the case where RMS>RCAM.

The calculated numerical aperture of the microscope body 2 or sampling pitch of the image-acquisition element 19 is stored in the storage unit 8.

Figure 4:
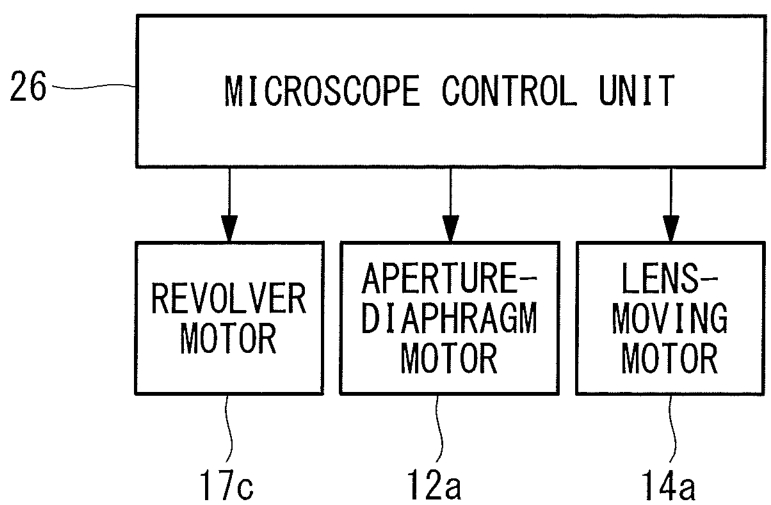
FIG. 4 is a block diagram showing the relationship between a microscope control unit and the microscope body provided in the microscope system in FIG. 1.

As shown in FIG. 4, the microscope control unit 26 is electrically connected to a revolver motor 17*c*, which is an objective-lens-changing driving device, and to the aperture-diaphragm motor 12*a* and the lens-moving motor 14*a* of the zoom optical system 14. Accordingly, the aperture diameter of the aperture diaphragm 12 is controlled by an electrical signal according to the numerical aperture of the microscope body 2, which is calculated by the control-value calculating unit 25.

The image-acquisition control unit 27 controls the sampling pitch of the image-acquisition element 19 according to the sampling pitch of the image-acquisition element 19 calculated by the control-value calculating unit 25.

The display unit 6 displays the image data output from the image processing unit 5, and displays the type of the objective lens 11 input at the input unit 7, the type of the camera adaptor 16, and information about the image-acquisition unit 3.

The input unit 7 is configured so that, as described above, the acquisition purpose of the 3D image data is selected from either "acquisition at high speed" or "acquisition with high precision" and is input, and in addition, the types of the objective lenses 11 attached to the microscope body 2, the type of the camera adaptor 16, and the information about the image-acquisition unit 3 are input thereto.

The storage unit 8 stores in advance all of the information about the optical elements in the microscope body 2. This information is, for example, a numerical aperture determined by combining a type of the objective lens 11 and a zoom magnification of the zoom optical system 14. In addition, the storage unit 8 stores the types of the objective lenses 11, the type of the camera adaptor 16, and the information about the image-acquisition unit 3, which are input at the input unit 7. In addition, the storage unit 8 is also configured to store the numerical aperture of the microscope body 2 or the sampling pitch of the image-acquisition element 19 calculated by the control-value calculating unit 25.

Figure 5:
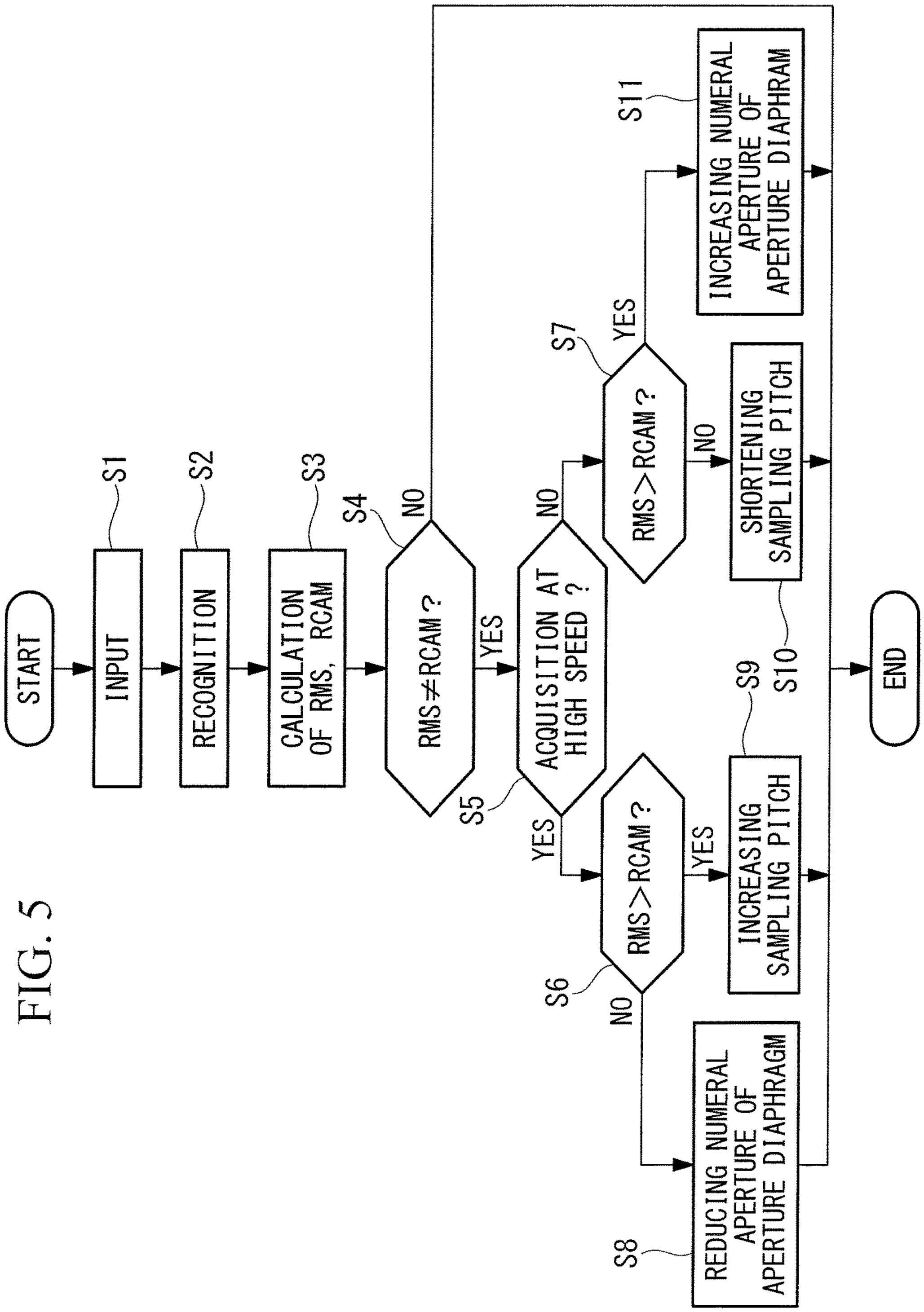
FIG. 5 is a flowchart for explaining a control of the microscope system in FIG. 1.

Next, an operation of the microscope system 1 according to this embodiment, configured as described above, will be described with reference to FIG. 5 and FIG. 6.

First, the type of the objective lens 11 inserted on the observation optical axis of the microscope body 2, the numerical aperture of the aperture diaphragm 12, the zoom magnification of the zoom optical system 14, the magnification of the camera adaptor 16, the information about the image-acquisition unit 3, and the acquisition purpose of the 3D image data acquisition, from the input unit 7, are input (step S1).

Figure 6:
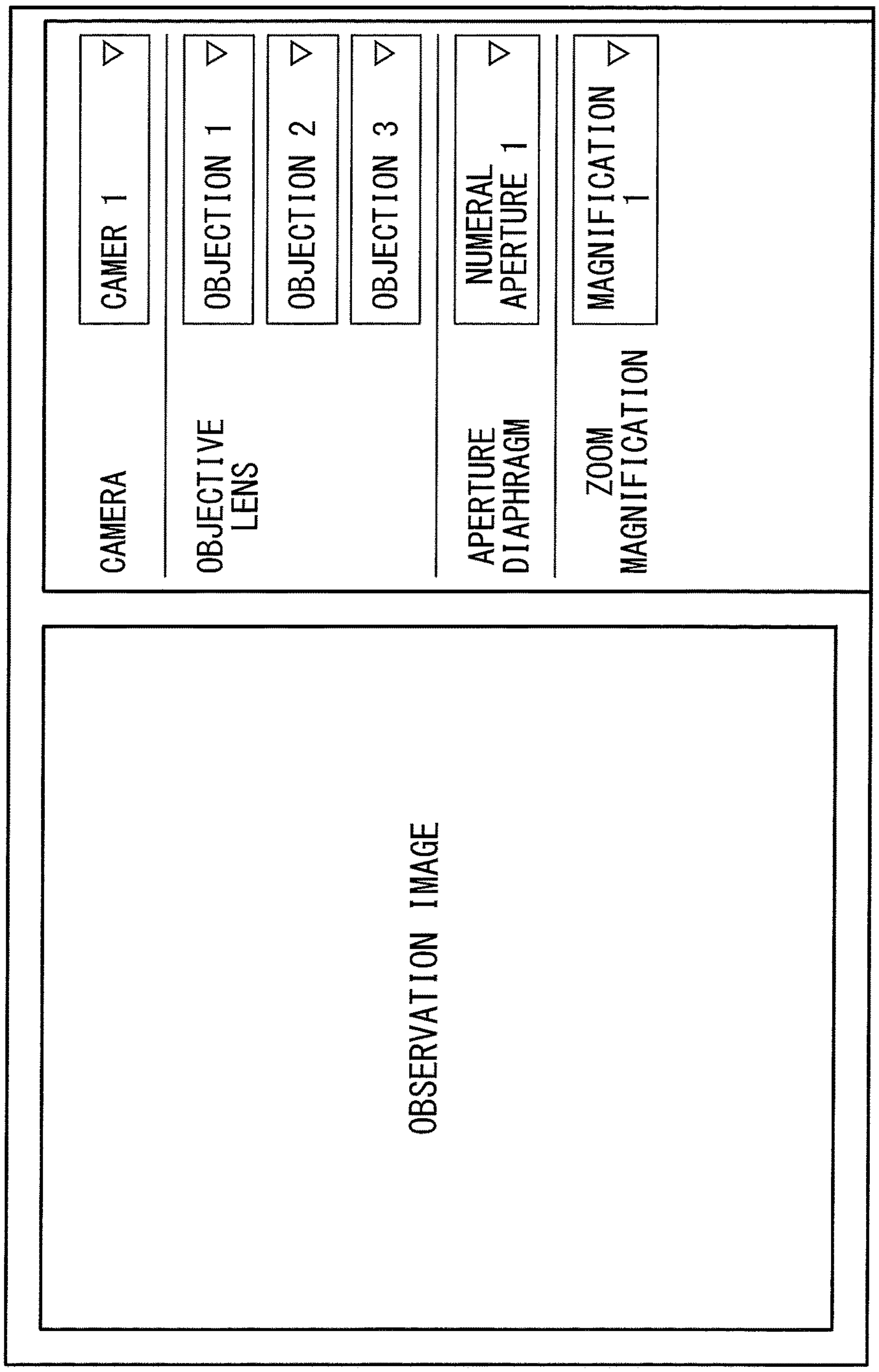
FIG. 6 is a diagram showing an example of a GUI displayed on a display unit in the microscope system in FIG. 1.

For example, a GUI screen as shown in FIG. 6 is displayed on the display unit 6, and the types of the objective lenses 11 attached to the revolver 17, the type of the camera adaptor 16, the information about the image-acquisition unit 3, and the acquisition purpose of the 3D image data acquisition are manually input using the input unit 7. The input information is stored in the storage unit 8.

The recognition unit 23 recognizes the type of the objective lens 11 inserted on the observation optical axis on the basis of the hole-identifying information output from the revolver 17. In addition, the numerical aperture NAAS of the aperture diaphragm 12 inserted in the observation optical axis is recognized on the basis of the numerical aperture information output from the aperture diaphragm 12. In addition, the zoom magnification of the zoom optical system 14 inserted on the observation optical axis is recognized on the basis of the zoom magnification information output from the zoom optical system 14 (step S2).

Next, the resolution calculating unit 24 calculates the microscope resolution value and the image-acquisition-element resolution value (step S3).

The resolution calculating unit 24 calculates a numerical aperture NAMS, which is determined by combining the type of the objective lens 11 and the zoom magnification of the zoom optical system 14, from the type of the objective lens 11 inserted in the observation optical axis of the microscope body 2, which is recognized by the recognition unit 23, the zoom magnification of the zoom optical system 14, and information about all of the optical elements, which is stored in advance in the storage unit 8.

Furthermore, the resolution calculating unit 24 calculates the microscope resolution value from the following expression.

$$RMS=0.61\cdot\lambda/NA$$

In this expression, λ is the wavelength of the illumination light irradiated on the image-acquisition plane, and NA is the smaller one of the numerical aperture NAMS and the numerical aperture NAAS of the aperture diaphragm 12, recognized by the recognition unit 23.

In addition, using the information about the image-acquisition unit 3 stored in advance in the storage unit 8, the resolution calculating unit 24 derives the sampling pitch of the image-acquisition element 19 inserted in the observation optical axis and derives the image-acquisition-element resolution value via the following expression.

$$RCAM=PCAM/2$$

In this expression, PCAM is the sampling pitch of the image-acquisition element 19.

Next, in the control-value calculating unit 25, the microscope resolution value and the image-acquisition-element resolution value which are calculated by the resolution calculating unit 24 are compared (step S4).

Thus, in the control-value calculating unit 25, the microscope resolution value and the image-acquisition-element resolution value which are calculated in the resolution calculating unit 24 are compared, and if RMS=RCAM, the processing ends.

If, as a result of the comparison, RMS ≠ RCAM, firstly the acquisition purpose of the 3D image data acquisition is determined (step S5). If the acquisition purpose is "acquisition at high speed", the processing proceeds to step S6; otherwise the acquisition purpose is "acquisition with high precision", and the processing proceeds to step S7.

If the acquisition purpose is "acquisition at high speed", the microscope resolution value and the image-acquisition-element resolution value which are calculated by the resolution calculating unit 24 are further compared (step S6); if RMS<RCAM, the processing proceeds to step S8, and if RMS>RCAM, the processing proceeds to step S9.

If RMS<RCAM, the numerical aperture of the microscope body 2 is controlled.

The control-value calculating unit 25 calculates the numerical aperture NASF of the aperture diaphragm 12 with the following expression so that the microscope resolution value calculated by the resolution calculating unit 24 becomes equal to the image-acquisition-element resolution.

$$NASF=1.22\cdot\lambda/PCAM \tag{1}$$

Then, the microscope control unit 26 controls the aperture diaphragm 12 so that the numerical aperture becomes the numerical aperture NASF calculated by the control-value calculating unit 25.

If RMS<RCAM, the microscope resolution value is increased, in other words, the microscope resolution is decreased, by reducing the numerical aperture of the aperture diaphragm 12, and by making it equal to the image-acquisition-element resolution value, in other words, the image-acquisition-element resolution as the lower one, acquisition of 3D image data is carried out at the image-acquisition-element resolution as the lower one. By reducing the microscope resolution, the focal depth becomes deeper, and therefore, it is possible to reduce the number of acquired images in the focal depth direction, thus achieving an increase in speed.

On the other hand, if RMS>RCAM, the sampling pitch of the image-acquisition element 19 is controlled.

The control-value calculating unit 25 calculates the sampling pitch PCAM of the image-acquisition element 19 with the following expression, so that the image-acquisition-element resolution value calculated by the resolution calculating unit 24 becomes equal to the microscope resolution value.

$$PCAM=1.22\cdot\lambda/NA \tag{2}$$

The image-acquisition control unit 27 controls the image-acquisition unit 3 so that the sampling pitch becomes the sampling pitch calculated by the control-value calculating unit 25.

If RMS>RCAM, the image-acquisition-element resolution value is increased, in other words, the image-acquisition-element resolution is decreased, by increasing the sampling pitch of the image-acquisition element 19, and by making it equal to the microscope resolution value, in other words, the microscope resolution as the lower one, acquisition of 3D image data is carried out at the microscope resolution as the lower one. By reducing the image-acquisition-element resolution, it is possible to reduce the number of acquired images in a direction perpendicular to the focal depth direction, thus achieving an increase in speed.

On the other hand, also in the case where the acquisition purpose of the 3D image data is "acquisition with high precision", the microscope resolution value and the image-acquisition-element resolution value which are calculated by the resolution calculating unit 24 are further compared (step S7), and if RMS<RCAM, the processing proceeds to step S10, whereas if RMS>RCAM, the processing proceeds to step S11.

If RMS<RCAM, the sampling pitch of the image-acquisition element 19 is controlled.

The control-value calculating unit 25 calculates the sampling pitch of the image-acquisition element 19 with expression (2) so that the microscope resolution value calculated by the resolution calculating unit 24 becomes equal to the image-acquisition-element resolution value.

Then, the image-acquisition control unit 27 controls the image-acquisition unit 3 so that the sampling pitch becomes the sampling pitch calculated by the control-value calculating unit 25 (step S10).

If RMS<RCAM, the image-acquisition-element resolution value is reduced, in other words, the image-acquisition-element resolution is increased, by reducing the sampling pitch of the image-acquisition element 19, and by making it the same as the microscope resolution value, in other words, the microscope resolution as the higher one, acquisition of 3D image data is performed at the microscope resolution as the higher one. By increasing the image-acquisition-element resolution, it is possible to increase the number of acquired images in a direction perpendicular to the focal depth direction, thus achieving a higher precision.

On the other hand, if RMS>RCAM, the numerical aperture of the aperture diaphragm 12 is controlled.

The control-value calculating unit 25 calculates the numerical aperture of the aperture diaphragm 12 using expression (1) so that the image-acquisition-element resolution value calculated by the resolution calculating unit 24 becomes equal to the microscope resolution value.

Then, the microscope control unit 26 controls the aperture diaphragm 12 so that the numerical aperture becomes the numerical aperture calculated by the control-value calculating unit 25 (step S11).

If RMS>RCAM, the microscope resolution value is reduced, in other words, the microscope resolution is increased, by increasing the numerical aperture of the aperture diaphragm 12, and by making it equal to the image-acquisition-element resolution value, in other words, the image-acquisition-element resolution as the higher one, acquisition of 3D image data is performed at the image-acquisition-element resolution as the higher one. By increasing the microscope resolution, the focal depth becomes shallower, and therefore, it is possible to increase the number of acquired images in the focal depth direction, thus achieving higher precision.

Accordingly, after the numerical aperture of the aperture diaphragm 12 or the sampling pitch of the image-acquisition element 19 is adjusted, the position of the specimen S is adjusted using the stage 10. The stage 10 is moved horizontally in two directions perpendicular to the observation optical axis, so that the viewing field of the image-acquisition element 19 is aligned with the observation area. Also, the stage 10 is moved in the observation optical axis direction so that the focal position of the objective lens is aligned with the height position of the specimen S.

When the illumination light is radiated from the light source 9, the illumination light is reflected by the half-mirror 13 and is irradiated on the specimen S. The reflected light or scattered light at the specimen S is collected by the objective lens 11, is transmitted through the half-mirror 13, passes through the zoom optical system 14, the trinocular tube 15, and the camera adaptor 16, and is captured by the image-acquisition element 19 of the image-acquisition unit 3.

With the microscope system 1 according to this embodiment, since the microscope resolution and the image-acquisition-element resolution are adjusted so as to be equal according to the acquisition purpose of the 3D image data, an advantage is afforded in that higher speed can be achieved by matching a higher resolution with a lower resolution, and higher precision can be achieved by matching a lower resolution with a higher resolution.

In this embodiment, although it has been assumed that the specimen is observed using epi-illumination, the specimen may be observed using trans-illumination.

Also, in this embodiment, it has been described that the types of the objective lenses 11 attached to the microscope body 2, the type of the camera adaptor 16, and the information about the image-acquisition unit 3 are manually input; however, they may be recognized automatically.

In addition, in this embodiment, it has been described that the type of the objective lens 11 inserted on the observation optical axis of the microscope body 2, the numerical aperture of the aperture diaphragm 12, and the information about the zoom magnification of the zoom optical system 14 are recognized automatically; however, they may be recognized manually.

In addition, in this embodiment, it has been assumed that the microscope control unit 26 and the image-acquisition control unit 27 automatically change the numerical aperture of the aperture diaphragm 12 or the sampling pitch of the image-acquisition element 19 on the basis of the numerical aperture or the sampling pitch calculated by the control-value calculating unit 25; however, a message such as "Please set the numerical aperture of the aperture diaphragm 12 to AA" or "Please set the resolution to BB" may be displayed on the display unit 6, so that these values are changed by the operator.

In addition, in this embodiment, although it has been described that, when adjusting the numerical aperture of the microscope body 2, the numerical aperture of the aperture diaphragm 12 is adjusted, instead of this, the objective lens 11 and the zoom optical system 14 may be adjusted.

In other words, the microscope control unit 26 may be electrically connected to the revolver 17, the aperture diaphragm 12, and the zoom optical system 14, and the revolver 17 and the zoom optical system 14 may be controlled with electrical signals according to the numerical aperture of the microscope body 2 calculated by the control-value calculating unit 25.

Figure 7:
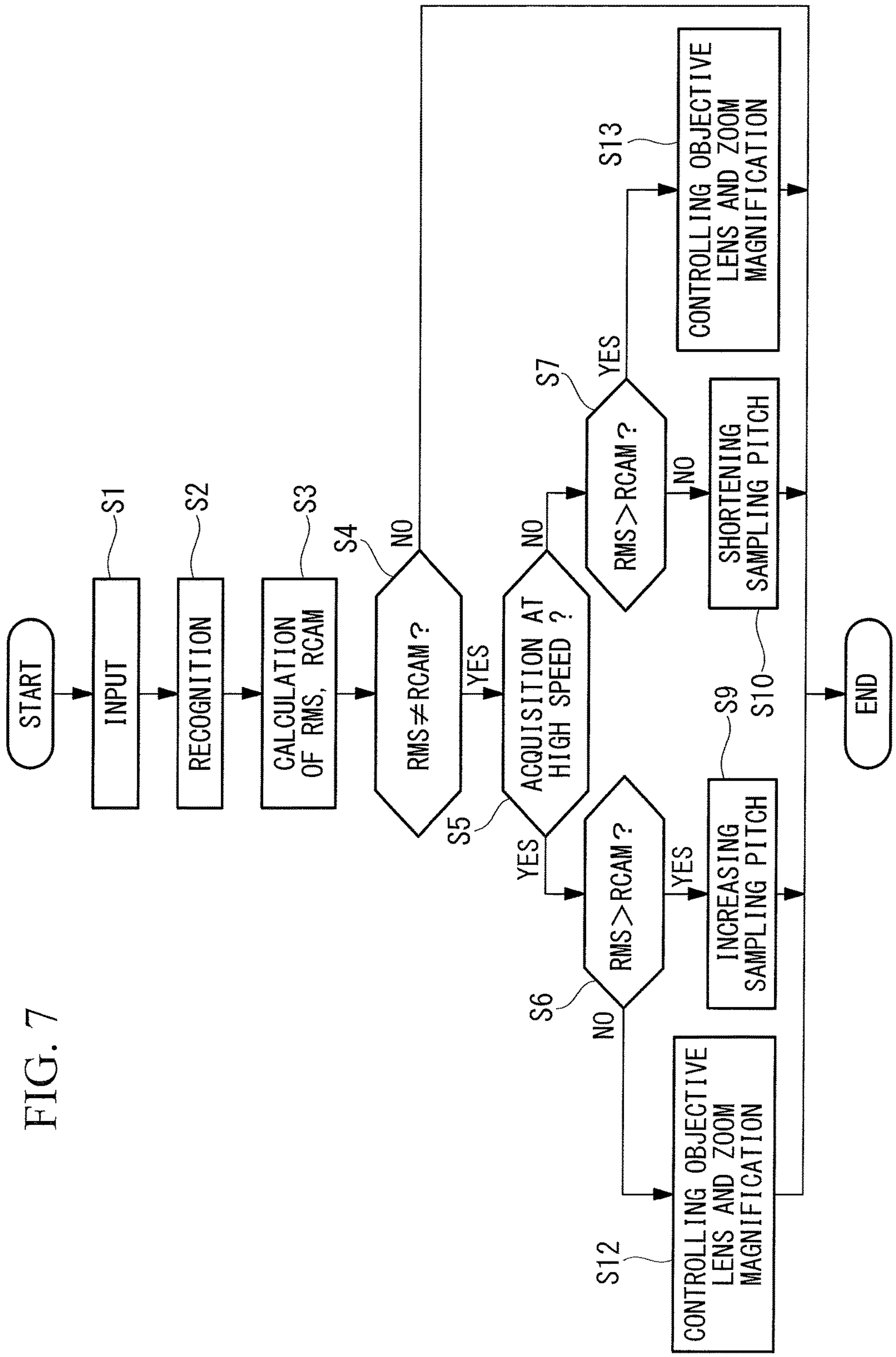
FIG. 7 is a flowchart showing a modification of FIG. 5.

Specifically, as shown in FIG. 7, in step S5, if the acquisition purpose of the 3D image data is high-speed acquisition, in the case where RMS<RCAM, the control-value calculating unit 25 should reduce the microscope resolution so that the microscope resolution matches the image-acquisition-element resolution, which is lower.

More specifically, first, the numerical aperture, which is determined based on the combination of the type of the objective lens 11 and the zoom magnification of the zoom optical system 14, is calculated using the following expression, so that the microscope resolution calculated by the resolution calculating unit 24 becomes equal to the image-acquisition-element resolution.

$$NAMS=1.22\cdot\lambda/PCAM$$

Next, the microscope control unit 26 should control the type of the objective lens 11 and the zoom magnification of the zoom optical system 14, to be a combination in which the numerical aperture calculated by the control-value calculating unit 25 is equal to the total magnification, which is determined by the magnification of the objective lens 11× the zoom magnification of the zoom optical system 14 (step S12).

On the other hand, in the case where RMS>RCAM, the sampling pitch of the image-acquisition element 19 is increased so that the image-acquisition-element resolution matches the microscope resolution, which is lower. Specifically, the control is similar to that in step S9 in FIG. 5.

In addition, in step S5 in FIG. 7, if the acquisition purpose of the 3D image data is high-precision acquisition, in the case where RMS>RCAM, the control-value calculating unit 25 should increase the microscope resolution so that the microscope resolution, which is lower, matches the image-acquisition-element resolution.

Specifically, the microscope control unit 26 should control the type of the objective lens 11 and the zoom magnification of the zoom optical system 14, to be a combination in which the numerical aperture calculated by the control-value calculating unit 25 is equal to the total magnification, which is determined by the magnification of the objective lens 11× the zoom magnification of the zoom optical system 14 (step S13).

Figure 8:
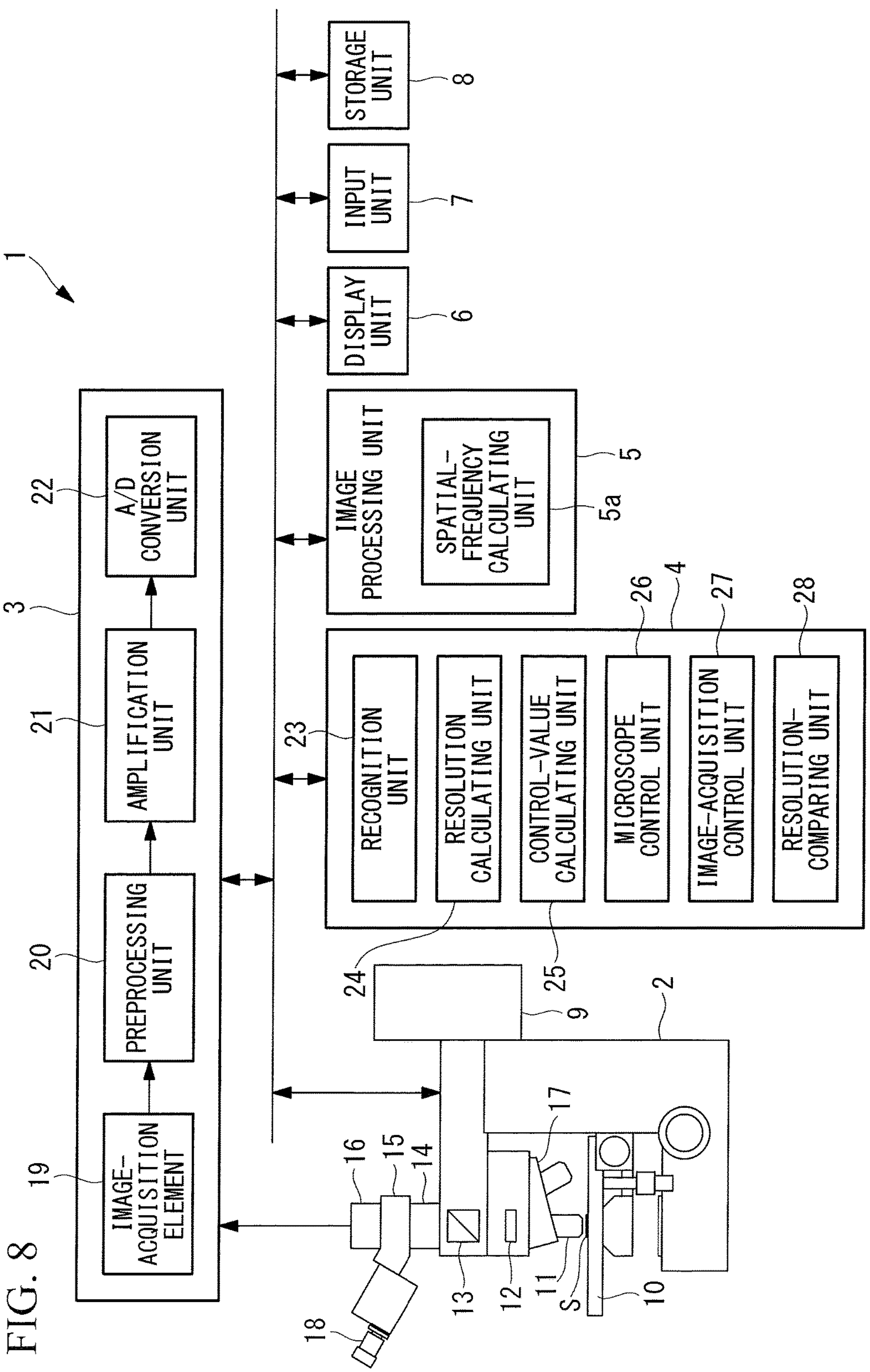
FIG. 8 is a diagram showing the overall configuration of a modification of the microscope system in FIG. 1.

In addition, in this embodiment, as shown in FIG. 8, the image processing unit 5 that processes the acquired image may be provided with a spatial-frequency calculating unit 5*a* that calculates a spatial frequency (hereinafter also referred to as ROBJ) from the acquired image, and the control unit 4 may be provided with a resolution-comparing unit 28.

The spatial-frequency calculating unit 5*a* calculates the spatial frequency by Fourier transformation transforming the image data of the specimen S acquired by the image-acquisition unit 3. Instead of Fourier transformation, a part including a high frequency or a specific frequency may be detected by a high-pass filter or a band-pass filter that allows the data pass a specific frequency band.

The resolution-comparing unit 28 compares the microscope resolution value calculated by the resolution calculating unit 24 and the spatial frequency calculated by the spatial-frequency calculating unit 5*a*, and changes the numerical aperture of the aperture diaphragm 12 so that the microscope resolution value and the spatial frequency become equal.

Figure 9:
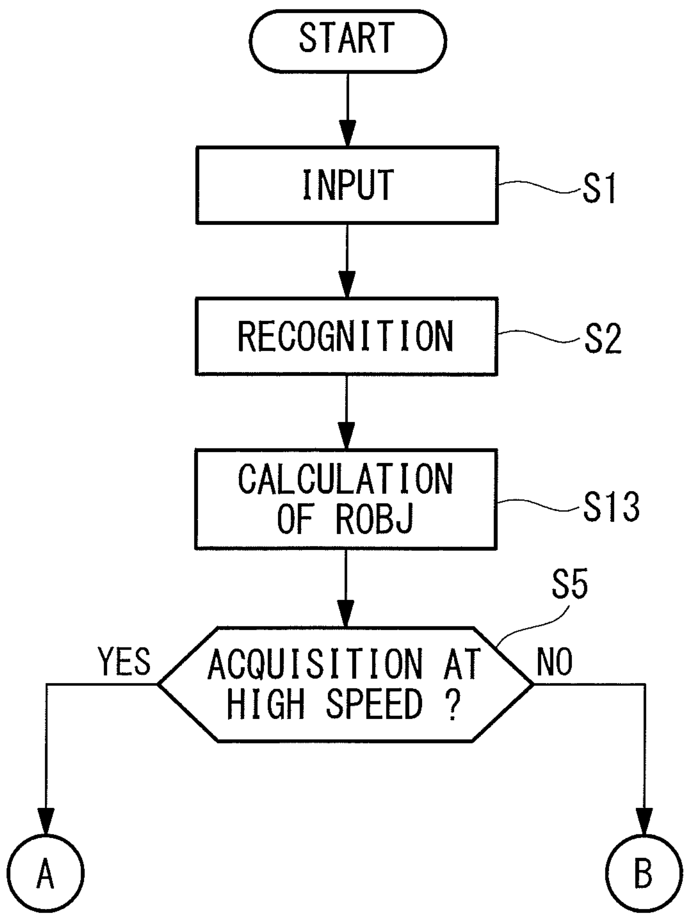
FIG. 9 is a flowchart for explaining a control of the microscope system in FIG. 8.
Figure 10:
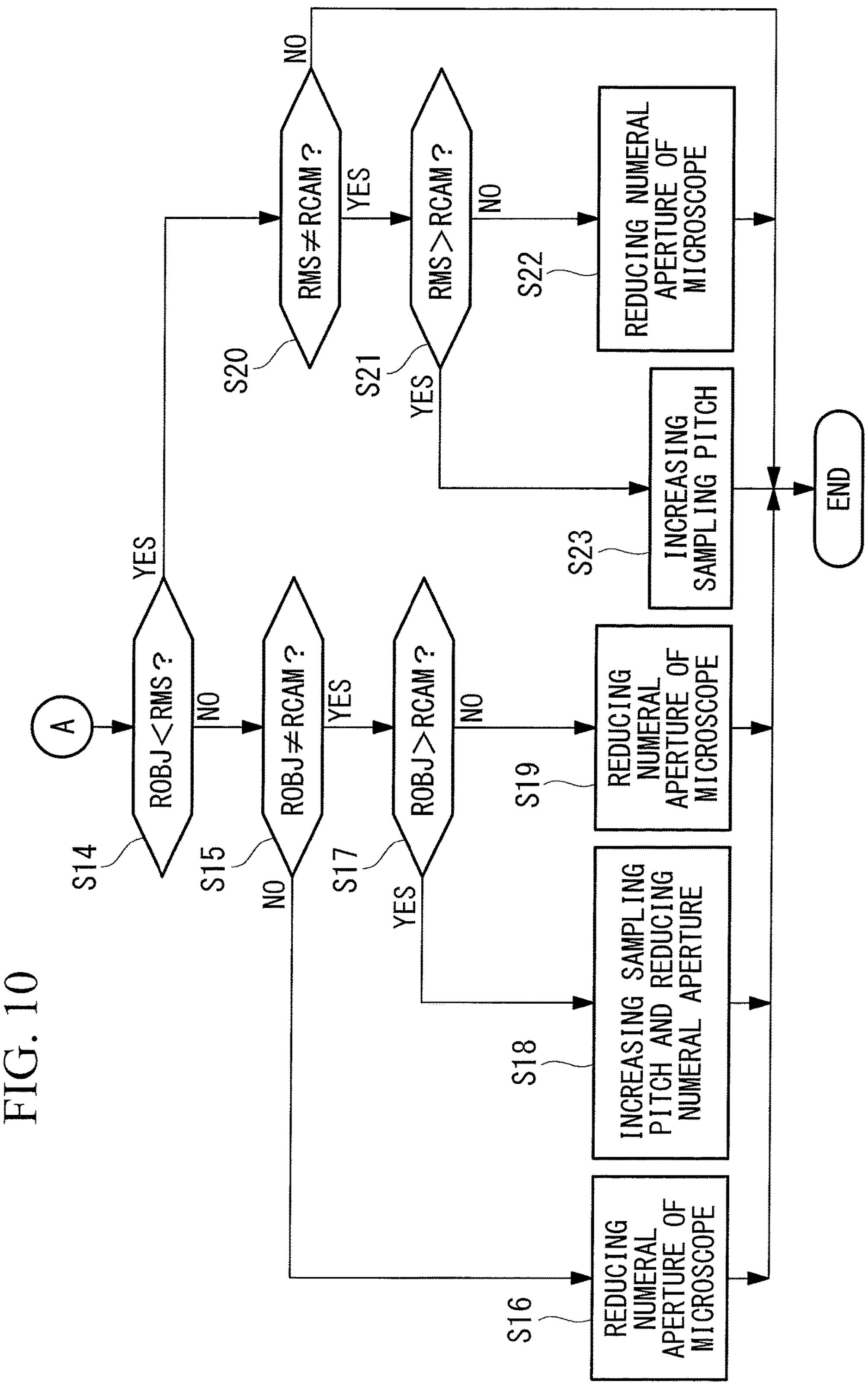
FIG. 10 is a flowchart continuing from A in FIG. 9.

In other words, as shown in FIG. 9, in step S13, the spatial frequency ROBJ of the specimen S is calculated, and in step S5, it is determined whether or not the acquisition purpose of the 3D image data is high-speed acquisition. If the acquisition purpose is high-speed acquisition, the processing proceeds to step S14 in FIG. 10, where the microscope resolution value calculated by the resolution calculating unit 24 and the spatial frequency of the specimen S calculated by the spatial-frequency calculating unit 5*a* are compared.

If, as a result of the comparison, ROBJ≥RMS, it is determined whether the image-acquisition-element resolution value is equal to the spatial frequency (step S15).

If ROBJ=RCAM, the numerical aperture of the microscope body 2 is controlled so as to decrease, so that the image-acquisition-element resolution value and the microscope resolution value become equal (step S16).

In step S16, if RMS=ROBJ=RCAM, the processing is terminated without performing the processing in step S16.

If ROBJ≠RCAM, the image-acquisition-element resolution value and the spatial frequency are compared (step S17), and if RCAM<ROBJ, control is performed so that the sampling pitch of the image-acquisition element 19 is increased to make the spatial frequency of the specimen S and the image-acquisition-element resolution value become equal, and in addition, the numerical aperture of the microscope body 2 is decreased in order to make the microscope resolution value and the spatial frequency become equal (step S18).

On the other hand, as a result of the comparison in step S17, if RCAM>ROBJ, the numerical aperture of the microscope body 2 is controlled in the direction in which it decreases, so that the microscope resolution value and the image-acquisition-element resolution value become equal (step S19).

In step S14, if ROBJ<RMS, it is determined whether the image-acquisition-element resolution value and the microscope resolution value are equal (step S20); if they are equal, the processing is terminated, and if they differ, the microscope resolution value and the image-acquisition-element resolution value are compared (step S21).

If RMS<RCAM, the aperture diaphragm 12 is controlled in the direction in which it is narrowed so that the microscope resolution matches image-acquisition-element resolution, which is lower (step S22), and if RMS>RCAM, the sampling pitch of the image-acquisition element 19 is controlled in the direction in which it increases so that the image-acquisition-element resolution matches the microscope resolution, which is lower (step S23).

By doing so, the microscope resolution value and the image-acquisition-element resolution value are adjusted so as to match the largest value among the spatial frequency of the specimen S, the microscope resolution value, and the image-acquisition-element resolution value, thus enabling a higher speed.

Figure 11:
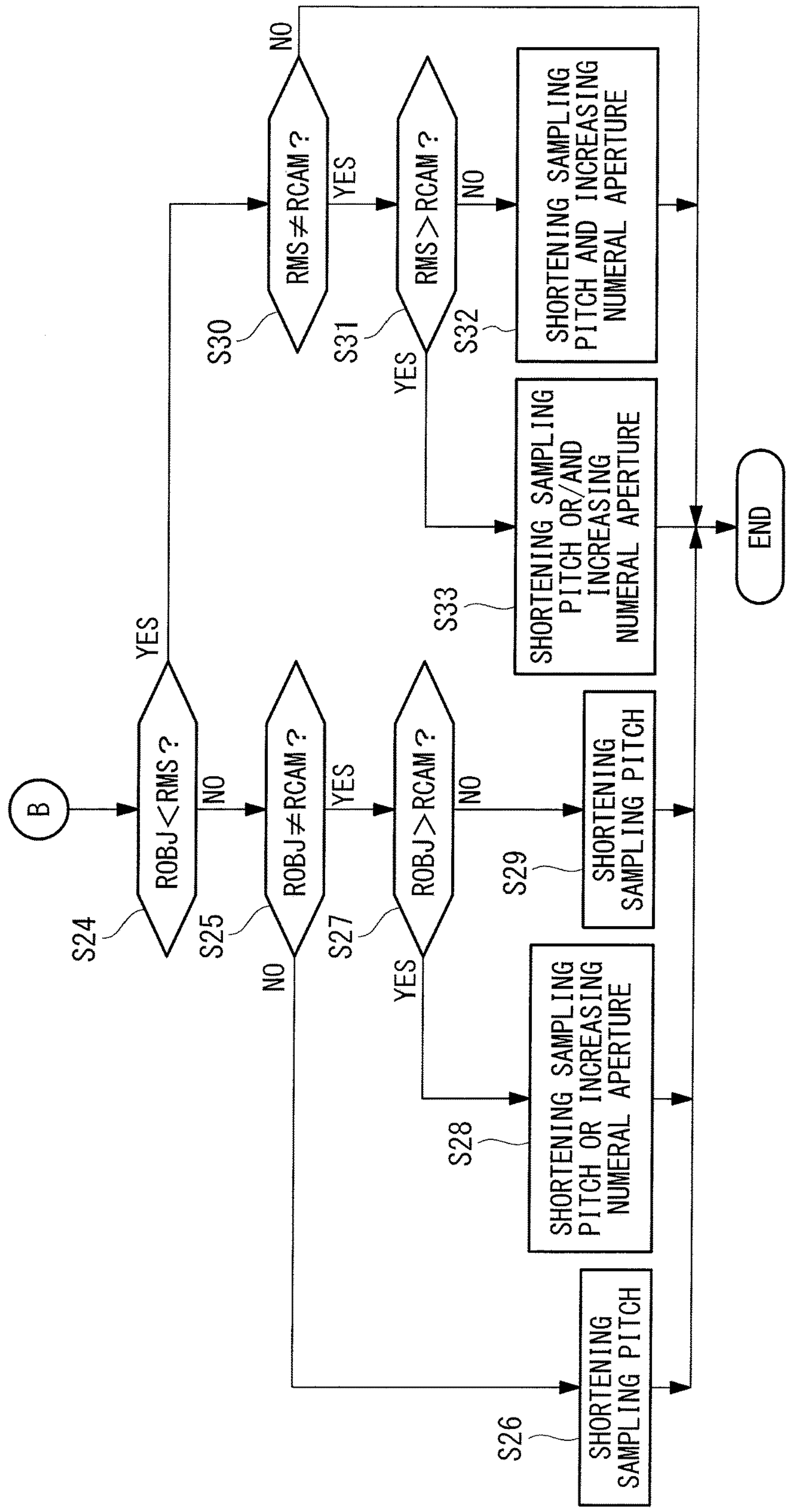
FIG. 11 is a flowchart continuing from B in FIG. 9.

In addition, in step S5, if the acquisition purpose of the 3D image data is not high-speed acquisition, the processing proceeds to step S24 in FIG. 11, where the microscope resolution value calculated by the resolution calculating unit 24 and the spatial frequency of the specimen S calculated by the spatial-frequency calculating unit 5*a* are compared.

If, as a result of the comparison, ROBJ≥RMS, it is determined whether the image-acquisition-element resolution value is equal to the spatial frequency (step S25).

If ROBJ=RCAM, the sampling pitch of the image-acquisition element 19 is controlled so as to decrease so that the image-acquisition-element resolution value and the microscope resolution value become equal (step S26).

In step S26, if RMS=ROBJ=RCAM, the processing is terminated without performing the processing at step S26.

If ROBJ≠RCAM, the image-acquisition-element resolution value and the spatial frequency are compared (step S27), and if RCAM<ROBJ, control is performed so that the sampling pitch of the image-acquisition element 19 is shortened to make the microscope resolution value and the image-acquisition-element resolution value become equal, or alternatively, so that the numerical aperture of the microscope body 2 is increased to make the microscope resolution value and the image-acquisition-element resolution value become equal (step S28).

In step S28, control is performed so that, if RCAM>RMS, the sampling pitch of the image-acquisition element 19 is shortened, and so that, if RCAM<RMS, the numerical aperture of the microscope body 2 is increased.

On the other hand, as a result of the comparison in step S27, if RCAM>ROBJ, the sampling pitch of the image-acquisition element 19 is controlled in the direction in which it decreases, so that the microscope resolution value and the image-acquisition-element resolution value become equal (step S29).

In step S24, if ROBJ<RMS, it is determined whether the image-acquisition-element resolution value and the microscope resolution value are equal (step S30); if they are equal, the processing is terminated, and if they differ, the microscope resolution value and the image-acquisition-element resolution value are compared (step S31).

If RMS<RCAM, control is performed so that the sampling pitch of the image-acquisition element 19 is shortened to make the spatial frequency of the specimen S and the image-acquisition-element resolution value become equal, and also, so that the numerical aperture of the microscope body 2 is increased to make the microscope resolution value and the spatial frequency become equal (step S32).

If RMS>RCAM, control is performed so as to execute at least one of shortening the sampling pitch of the image-acquisition element 19 and increasing the numerical aperture of the microscope body 2, so as to make the resolution equal to the smaller value of the spatial frequency of the specimen S and the image-acquisition-element resolution value (step S33).

In step S33, if RCAM>ROBJ, the control is performed so that the sampling pitch of the image-acquisition element 19 can be shortened to make the spatial frequency of the specimen S and the image-acquisition-element resolution value become equal, and so as to increase the numerical aperture of the microscope body 2 to make the spatial frequency of the specimen S and the microscope resolution value become equal.

On the other hand, if RCAM<ROBJ, the numerical aperture of the microscope body 2 is controlled so as to increase to make the microscope resolution value and the image-acquisition-element resolution value become equal.

By doing so, the microscope resolution value and the image-acquisition-element resolution value are adjusted to match the smallest value among the spatial frequency of the specimen S, the microscope resolution value, and the image-acquisition-element resolution value, thus enabling higher precision.

An aspect of the preset invention which includes the aforementioned embodiments is a microscope system comprising: a microscope which forms an image of a specimen inserted onto an optical axis and whose numeral aperture is changeable; an image-acquisition apparatus which has an image-acquisition element and which captures the image of the specimen through the microscope; a purpose input unit with which an acquisition purpose of 3D image data is input; and a controller which receives the acquisition purpose input using the purpose input unit and which send a control signal to the microscope and the image-acquisition apparatus, wherein the controller is configured to receive information about the numerical aperture of the microscope and information of a sampling pitch of the image-acquisition element, and configured to calculate a microscope resolution value and an image-acquisition-element resolution value on the basis of the received information about the numerical aperture and the information about the sampling pitch, wherein the controller is configured to send at least one of the control signal for controlling the numeral aperture of the microscope and the control signal for controlling the sampling pitch of the image-acquisition element in response to the acquisition purpose to at least one of the microscope and the image-acquisition apparatus so that the calculated microscope resolution value and the calculated image-acquisition-element resolution value become the same.

With this aspect, when the specimen is located on the optical axis of the microscope, the image of the specimen is formed by the microscope and the image is captured by the image-acquisition element to acquire the image data. On the other hand, the numeral aperture of the microscope and the sampling pitch of the image-acquisition element are recognized, and the microscope resolution value and the image-acquisition-element resolution value are calculated on the basis of the recognized numeral aperture and the recognized sampling pitch.

When the acquisition purpose of the 3D image data is input by the purpose input unit, at least one of the numeral aperture of the microscope and the sampling pitch of the image-acquisition element in response to the acquisition purpose so that the calculated microscope resolution value and the calculated image-acquisition-element resolution value become the same. With this configuration, since the microscope resolution value and the image-acquisition-element resolution value become the same, a microscope system with few useless configurations and processes for achieving the acquisition purpose.

In the aforementioned aspect, in a case in which the received acquisition purpose of the 3D image data is acquiring at high speed, the controller may be configured to send the control signal for reducing the numeral aperture of the microscope to the microscope when the microscope resolution value is smaller than the image-acquisition-element resolution value, and configured to send the control signal for increasing the sampling pitch of the image-acquisition element to the image-acquisition apparatus when the microscope resolution value is larger than the image-acquisition-element resolution value.

With this configuration, when the microscope resolution value is smaller than the image-acquisition-element resolution value, with the focal depth which is made deep by controlling the numeral aperture of the microscope, and also by reducing the microscope resolution value, it is possible to acquire the 3D image data with a resolution which is defined by the microscope resolution value, which is the lower one, and also it is possible to achieve the purpose of acquiring at high speed by reducing the number of acquired images in the focal depth direction on the basis of the reduction of the numeral aperture of the microscope.

On the other hand, when the microscope resolution value is larger than the image-acquisition-element resolution value, by increasing the frame rate by controlling the sampling pitch of the image-acquisition element, it is possible to acquire the 3D image data having a resolution determined by the image-acquisition-element resolution value, which is the lower one, and it is possible to achieve the purpose of acquiring at high speed by reducing the number of samples in the direction perpendicular to the focal depth on the basis of the sampling pitch which is increased.

Further, in the aforementioned aspect, in a case in which the received acquisition purpose of the 3D image data is acquiring with high precision, the controller may be configured to send the control signal for reducing the sampling pitch of the image-acquisition element to the image-acquisition apparatus when the microscope resolution value is smaller than the image-acquisition-element resolution value, and configured to send the control signal for increasing the numeral aperture of the microscope to the microscope when the microscope resolution value is larger than the image-acquisition-element resolution value.

With the aforementioned configuration, when the microscope resolution value is smaller than the image-acquisition-element resolution value, by reducing the sampling pitch of the image-acquisition apparatus, it is possible to acquire the 3D image data having a resolution determined by the image-acquisition-element resolution value, which is the higher one, and it is possible to achieve the purpose of acquiring with high precision by increasing the number of samples in the direction perpendicular to the focal depth on the basis of the sampling pitch which is reduced.

On the other hand, when the microscope resolution value is larger than the image-acquisition-element resolution value, with the focal depth which is made shallow by controlling the numeral aperture of the microscope, and also by increasing the microscope resolution value, it is possible to acquire the 3D image data with a resolution which is defined by the microscope resolution value, which is the higher one, and also it is possible to achieve the purpose of acquiring with high precision by increasing the number of acquired images in the focal depth direction on the basis of the of the numeral aperture of the microscope which is increased.

Further, in the aforementioned aspect, the controller may be configured to analyze a spatial frequency for the image data captured by the image-acquisition apparatus. Also, in a case in which the received acquisition purpose of the 3D image data is acquiring at high speed, the controller may be configured to send at least one of the control signal for controlling the numeral aperture of the microscope and the control signal for controlling the sampling pitch of the image-acquisition element to at least one of the microscope and the image-acquisition apparatus so that the microscope resolution and/or the image-acquisition-element resolution matches the largest value among the special frequency, the microscope resolution value, and the image-acquisition-element resolution value.

With this configuration, when the acquisition purpose of the 3D data is acquiring at high speed, the microscope resolution and the image-acquisition-element resolution are lowered by performing at least one of the control of reducing the numeral aperture of the microscope and the control of increasing the sampling pitch of the image-acquisition element so that the microscope resolution and/or the image-acquisition-element resolution matches the largest value among the calculated special frequency, the microscope resolution value, and the image-acquisition-element resolution value. By this operation, it is possible to acquire the 3D image data defined by the lowest resolution, it is possible to reduce the number of the images in the focal depth direction on the basis of the reduction of the numeral aperture of the microscope, and it is possible to achieve the purpose of acquiring at high speed by reducing the number of samples in the direction perpendicular to the focal depth direction on the basis of the sampling pitch which is increased.

Further, in the aforementioned aspect, in a case in which the received acquisition purpose of the 3D image data is acquiring with high precision, the controller may be configured to send at least one of the control signal for controlling the numeral aperture of the microscope and the control signal for controlling the sampling pitch of the image-acquisition element to at least one of the microscope and the image-acquisition apparatus so that the microscope resolution and/or the image-acquisition-element resolution matches the smallest value among the special frequency, the microscope resolution value, and the image-acquisition-element resolution value.

With this configuration, when the acquisition purpose of the 3D data is acquiring with high precision, the microscope resolution and the image-acquisition-element resolution are increased by performing at least one of the control of increasing the numeral aperture of the microscope and the control of reducing the sampling pitch of the image-acquisition element so that the microscope resolution and/or the image-acquisition-element resolution matches the smallest value among the calculated special frequency, the microscope resolution value, and the image-acquisition-element resolution value. By this operation, it is possible to acquire the 3D image data defined by the highest resolution, it is possible to increase the number of the images in the focal depth direction on the basis of the numeral aperture of the microscope which is increased, and it is possible to achieve the purpose of acquiring with high precision by increasing the number of samples in the direction perpendicular to the focal depth direction on the basis of the reduction of the sampling pitch.

The aforementioned aspects afford an advantage in which 3D image data can be acquired according to the purposes.

REFERENCE SIGNS LIST

1 microscope system
2 microscope body (microscope)
5*a* spatial-frequency calculating unit
7 input unit (purpose input unit)
19 image-acquisition element
23 recognition unit
24 resolution calculating unit
26 microscope control unit (resolution control unit)
27 image-acquisition control unit (resolution control unit)
S specimen

The invention claimed is:

1. A microscope system comprising:

a microscope which forms an image of a specimen inserted onto an optical axis and whose numeral aperture is changeable;

an image-acquisition apparatus which has an image-acquisition element and which captures the image of the specimen through the microscope;

and a controller comprising hardware, wherein the controller is configured to:

receive an acquisition instruction of 3D image data and send a control signal to the microscope and the image-acquisition apparatus, receive information about the numerical aperture of the microscope and information of a sampling pitch of the image-acquisition element, and calculate a microscope resolution value and an image-acquisition-element resolution value on the basis of the received information about the numerical aperture and the information about the sampling pitch, and send at least one of the control signals selected from a group consisting of the control signal for controlling the numeral aperture of the microscope and the control signal for controlling the sampling pitch of the image-acquisition element in response to the acquisition instruction to at least one of the microscope and the image-acquisition apparatus so that the calculated microscope resolution value and the calculated image-acquisition-element resolution value become the same, wherein in a case in which the received acquisition instruction of the 3D image data is acquiring at high speed, the controller is configured to send the control signal for reducing the numerical aperture of the microscope to the microscope when the microscope resolution value is smaller than the image-acquisition-element resolution value, and the controller is configured to send the control signal for increasing the sampling pitch of the image-acquisition element to the image-acquisition apparatus when the microscope resolution value is larger than the image-acquisition-element resolution value.

2. A microscope system comprising:

a microscope which forms an image of a specimen inserted onto an optical axis and whose numeral aperture is changeable;

an image-acquisition apparatus which has an image-acquisition element and which captures the image of the specimen through the microscope;

and a controller comprising hardware, wherein the controller is configured to:

receive an acquisition instruction of 3D image data and send a control signal to the microscope and the image-acquisition apparatus, receive information about the numerical aperture of the microscope and information of a sampling pitch of the image-acquisition element, and calculate a microscope resolution value and an image-acquisition-element resolution value on the basis of the received information about the numerical aperture and the information about the sampling pitch, and send at least one of the control signals selected from a group consisting of the control signal for controlling the numeral aperture of the microscope and the control signal for controlling the sampling pitch of the image-acquisition element in response to the acquisition instruction to at least one of the microscope and the image-acquisition apparatus so that the calculated microscope resolution value and the calculated image-acquisition-element resolution value become the same, wherein in a case in which the received acquisition instruction of the 3D image data is acquiring with high precision, the controller is configured to send the control signal for reducing the sampling pitch of the image-acquisition element to the image-acquisition apparatus when the microscope resolution value is smaller than the image-acquisition-element resolution value, and configured to send the control signal for increasing the numeral aperture of the microscope to the microscope when the microscope resolution value is larger than the image-acquisition-element resolution value.

3. A microscope system comprising:

a microscope which forms an image of a specimen inserted onto an optical axis and whose numeral aperture is changeable;

an image-acquisition apparatus which has an image-acquisition element and which captures the image of the specimen through the microscope;

and a controller comprising hardware, wherein the controller is configured to:

receive an acquisition instruction of 3D image data and send a control signal to the microscope and the image-acquisition apparatus, receive information about the numerical aperture of the microscope and information of a sampling pitch of the image-acquisition element, and calculate a microscope resolution value and an image-acquisition-element resolution value on the basis of the received information about the numerical aperture and the information about the sampling pitch, and send at least one of the control signals selected from a group consisting of the control signal for controlling the numeral aperture of the microscope and the control signal for controlling the sampling pitch of the image-acquisition element in response to the acquisition instruction to at least one of the microscope and the image-acquisition apparatus so that the calculated microscope resolution value and the calculated image-acquisition-element resolution value become the same, wherein an image processor is configured to analyze a spatial frequency for the image data captured by the image-acquisition apparatus, wherein in a case in which the received acquisition instruction of the 3D image data is acquiring at high speed, the controller is configured to send at least one of the control signals selected from a group consisting of the control signal for controlling the numeral aperture of the microscope and the control signal for controlling the sampling pitch of the image-acquisition element, to at least one of the microscope and the image-acquisition apparatus so that the microscope resolution and/or the image-acquisition-element resolution matches the largest value among the spatial frequency, the microscope resolution value, and the image-acquisition-element resolution value.

4. A microscope system comprising:

a microscope which forms an image of a specimen inserted onto an optical axis and whose numeral aperture is changeable;

an image-acquisition apparatus which has an image-acquisition element and which captures the image of the specimen through the microscope;

and a controller comprising hardware, wherein the controller is configured to:

receive an acquisition instruction of 3D image data and send a control signal to the microscope and the image-acquisition apparatus, receive information about the numerical aperture of the microscope and information of a sampling pitch of the image-acquisition element, and calculate a microscope resolution value and an image-acquisition-element resolution value on the basis of the received information about the numerical aperture and the information about the sampling pitch, and send at least one of the control signals selected from a group consisting of the control signal for controlling the numeral aperture of the microscope and the control signal for controlling the sampling pitch of the image-acquisition element in response to the acquisition instruction to at least one of the microscope and the image-acquisition apparatus so that the calculated microscope resolution value and the calculated image-acquisition-element resolution value become the same, wherein an image processor is configured to analyze a spatial frequency for the image data captured by the image-acquisition apparatus, wherein in a case in which the received acquisition instruction of the 3D image data is acquiring with high precision, the controller is configured to send at least one of the control signals selected from a group consisting of the control signal for controlling the numeral aperture of the microscope and the control signal for controlling the sampling pitch of the image-acquisition element to at least one of the microscope and the image-acquisition apparatus so that the microscope resolution and/or the image-acquisition-element resolution matches the smallest value among the spatial frequency, the microscope resolution value, and the image-acquisition-element resolution value.

* * * * *